INVENTOR
C. F. KURTH
BY R. B. Ardis
ATTORNEY

Dec. 8, 1970 C. F. KURTH 3,546,703

DIGITAL PHASE LOCKED LOOP BILATERAL TRANSMISSION SYSTEM INCLUDING AUXILIARY AUTOMATIC PHASE CONTROL

Filed Dec. 27, 1967 3 Sheets-Sheet 2

United States Patent Office 3,546,703

Patented Dec. 8, 1970

3,546,703

DIGITAL PHASE LOCKED LOOP BILATERAL TRANSMISSION SYSTEM INCLUDING AUXILIARY AUTOMATIC PHASE CONTROL

Carl F. Kurth, Andover, Mass., assignor to Bell Telephone Laboratories, Incorporated, Murray Hill and Berkeley Heights, N.J., a corporation of New York Filed Dec. 27, 1967, Ser. No. 693,906

Int. Cl. H04b *1/56*

U.S. Cl. 343—179 8 Claims

ABSTRACT OF THE DISCLOSURE

An FM digital bilateral transmission system is disclosed comprising a transceiver at each end connected by a lossy transmission medium. Each transceiver comprises a digital phase locked loop having a limited phase tracking capability which converts the received analog modulated carrier to a series of pulses representative of the analog modulated carrier. An auxiliary control circuit is included in one of the transceivers to extend its phase variation tracking range and that of the digital bilateral transmission system.

CROSS REFERENCE TO RELATED APPLICATIONS

The following are related applications, W. B. Gaunt, Jr., Ser. No. 678,398, filed Oct. 26, 1967; C. F. Kurth, Ser. No. 693,904, filed Dec. 27, 1967; C. F. Kurth, Ser. No. 693,905, filed Dec. 27, 1967; C. F. Kurth-F. J. Witt, Ser. No. 694,012, filed Dec. 27, 1967; C. F. Kurth-R. C. MacLean, Ser. No. 693,967, filed Dec. 27, 1967; C. F. Kurth, Ser. No. 693,922, filed Dec. 27, 1967.

BACKGROUND OF THE INVENTION

This invention relates generally to digital bilateral transmission systems and, more particularly, to digital bilateral transmission systems employing digital phase locked loops at each end connected by a lossy transmission medium.

A frequency modulated digital bilateral transmission system employing a digital phase locked loop at each end has been set forth in a related application by C. F. Kurth, Ser. No. 693,967, filed concurrently with the present invention. The bilateral transmission system disclosed therein eliminates the amplitude dependency for reception by the phase locked loop. That system may be utilized in a lossy transmission medium where the phase shift suffered by the modulated carrier in the transmission medium is negligible. Where significant phase shift is suffered by the modulated carrier in the transmission medium, the operation of the digital bilateral transmission system may be impaired because of the attendant limited phase variation tracking range of each phase locked loop. This degradation in performance is primarily due to the limited loop gain in the phase locked loop. Where a digital bilateral transmission system employing a transceiver at each end comprising a digital phase locked loop is to be employed in a medium in which there will be a significant phase shift, the phase variation tracking range of the bilateral transmission system may be extended by extending the phase variation tracking range of the phase locked loop.

The present invention, although not limited to such an application, may be used for telephone transmission. At present, there is an increasing demand for additional telephones in areas in which there is already an overcrowded condition with regard to telephone lines. These telephone lines extend from a central office to individual subscribers served by the central office. When it is unfeasible to install additional lines in these areas, carrier transmission employing pre-existing lines may be employed. Carrier transmission may also be employed in remote areas where telephone lines exist since it may be less expensive to employ carrier transmission than add additional lines. Where carrier transmission is employed, the telephone lines are "lossy" and also introduce significant phase shift to the modulated carrier.

The bilateral transmission system including a digital phase locked loop at each end may, as discussed above, be employed between a central office and a subscriber. A separate phase locked loop is installed at the central office corresponding to a phase locked loop for each subscriber. Since the distance between the central office and each subscriber may vary, the phase shift suffered by a modulated carrier to each subscriber will also vary. This variation may be compensated for at the time of installation by auxiliary equipment and complex installation procedures. It would be preferable, though, to provide a telephone receiver which automatically compensates for the phase shift suffered by the modulated carrier in the transmission line.

An object of the present invention is to provide a transceiver, similar in operation to a digital phase locked loop, which can automatically compensate for phase shift suffered through the transmission medium.

Another object of the present invention is to extend the phase variation tracking range of a digital phase locked loop.

Still another object of the present invention is to provide a digital bilateral transmission system employing a digital phase locked loop at one end and a digital transceiver at the other, where the transmission medium may introduce significant phase shift to the modulated carrier.

SUMMARY OF THE INVENTION

In accordance with the invention, the above objects are accomplished by providing a transceiver comprising a digital phase locked loop. The transceiver receives an analog modulated carrier which is converted to digital form. The received modulated carrier is applied to a first level sensor, the output of which is applied to a first pulse former. As the amplitude of the received modulated carrier rises above a predetermined level, a pulse is initiated in the pulse former and as the amplitude falls below a predetermined level, the pulse is terminated. The series of pulses produced by the first pulse former are applied to a digital phase comparator. The phase locked loop includes a voltage controlled oscillator which provides a carrier wave for a signal to be transmitted by the phase locked loop. In accordance with one feature of the present invention, the output of the oscillator is supplied to a phase shifter which compensates for the phase shift suffered by the modulated carrier in the transmission medium. The phase shifted oscillator output is supplied to the digital phase comparator after passing through a level sensor and pulse former which convert the phase shifted analog output of the voltage controlled oscillator to a series of pulses in the same manner as the digital conversion of the received analog modulated carrier.

The digital phase comparator produces an output which is proportional to the time displacement between respective pulses of the pulse trains applied to the phase comparator. In accordance with another feature of the present invention, this output, initially, controls the phase shifter rather than the voltage controlled oscillator.

In accordance with an additional feature of the present invention, the above-described digital phase locked loop with the auxiliary control circuit is employed as a transceiver at one end of a bilateral transmission system, while a digital phase locked loop is employed at the other. By increasing the phase variation tracking range at one end, the phase variation tracking range of the digital bilateral transmission system is also extended.

In accordance with another feature of the present invention, in the digital bilateral transmission system the digital phase locked loop maintains frequency synchronism between its voltage controlled oscillator and that of the digital phase locked loop with the auxiliary control circuit. The output from the digital phase comparator in the phase locked loop is proportional to the phase difference between its compared signals. Since frequency is the mathematical derivative of phase, the output of the phase comparator is proportional to the frequency difference variations between the signals compared. In the phase locked loop of the present bilateral transmission system, the output of the phase comparator is supplied to the voltage controlled oscillator to adjust its frequency so that it is in synchronism with the frequency of the modulated carrier received by the phase locked loop.

DETAILED DESCRIPTION

A frequency modulated digital bilateral transmission system employing a transceiver at each end comprising a digital phase locked loop has been described in an application by C. F. Kurth, Ser. No. 693,967, filed concurrently with the present invention. When a modulated carrier in the bilateral transmission system suffers significant phase shift, its operation may be impaired because of the limited phase tracking range of each phase locked loop.

Figure 1:
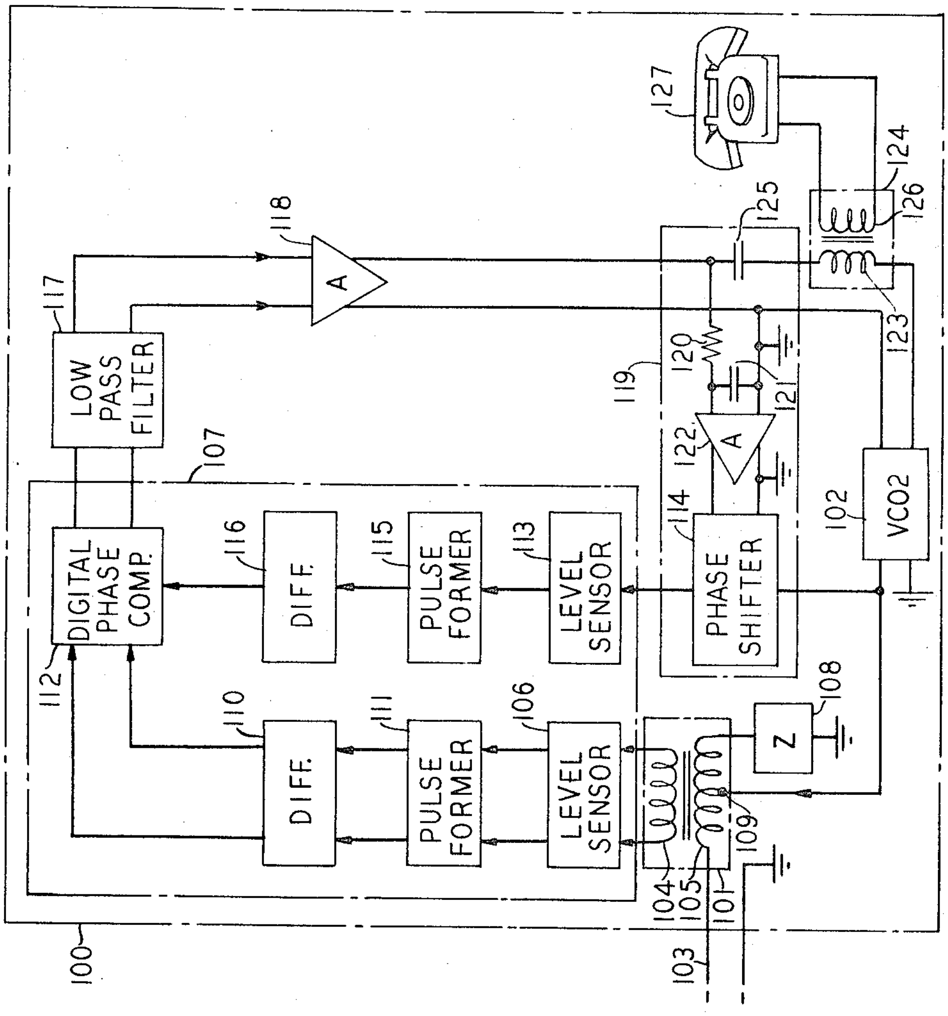
FIG. 1 is a block diagram of a transceiver including an auxiliary control circuit which automatically compensates for phase shift suffered by a modulated carrier in the transmission medium.

FIG. 1 is a block diagram of a transceiver comprising a digital phase locked loop and an auxiliary control circuit which automatically compensates for the phase shift suffered by a modulated carrier in the transmission medium. Transceiver 100 transmits and receives a modulated carrier. Means are provided in transceiver 100 to separate the transmitted from the received modulated carrier. Hybrid 101, which is pat of transceiver 100, serves this separation function, insuring that the modulated carrier output of voltage controlled oscillator 102 is transmitted to transmission line 103. A voltage controlled oscillator whose frequency output is linearly proportional to its voltage input may be used in the present invention. An example of a voltage controlled oscillator suitable for use in the present invention may be found on page 67 of "Phase-Lock Techniques," written by F. M. Gardner and published by John Wiley & Sons, Inc. in 1966. Hybrid 101 consists of primary winding 104 and secondary winding 105. Primary winding 104 is connected to level sensor 106 which is included as part of the analog to digital converter and digital phase comparator 107. One end of secondary winding 105 is connected to terminating impedance 108, while the other end of secondary winding 105 is connected to transmission line 103. Secondary winding 105 is tapped at point 109 which is connected to voltage controlled oscillator 102. Hybrid 101 insures that the output of voltage controlled oscillator 102 received at point 109 is transferred to transmission line 103 and not transferred to primary winding 104. In addition, hybrid 101 insures that the modulated carrier received by transceiver 100 at secondary winding 105 is transferred to primary winding 104 while not being transferred to voltage controlled oscillator 102. Therefore, the hybrid serves to separate the modulated carrier received from that transmitted by transceiver 100.

The modulated carrier received by transceiver 100 is applied to level sensor 106 through hybrid 101. The output of level sensor 106 is connected to differentiator 110 through pulse former 111. Level sensor 106 causes pulse former 111 to initiate a pulse when the level of the modulated carrier received by transceiver 100 crosses a predetermined level and causes pulse former 111 to terminate the pulse when the modulated carrier received by transceiver 100 falls below another predetermined level. Since the signal carried by the carrier received by transceiver 100 causes the modulation frequency to vary, the beginning of each pulse produced by pulse former 111 will vary in accordance with the signal carried by the modulated carrier received by transceiver 100. The output of pulse former 111 is differentiated by differentiator 110 before being applied to digital phase comparator 112.

Voltage controlled oscillator 102 provides a carrier wave for the signal to be transmitted by transceiver 100. The output of voltage controlled oscillator 102 is connected to tapped point 109 of hybrid 101 for transmission through transmission line 103. In addition, the output of voltage controlled oscillator 102 is connected to level sensor 113 through phase shifter 114. Level sensor 113 is connected to pulse former 115 and causes pulse former 115 to initiate a pulse when the phase shifted output of voltage controlled oscillator 102 rises above a predetermined level and terminate the pulse when the phase shifted output of voltage controlled oscillator 102 falls below another predetermined level. A series of pulses is produced at the output of pulse former 115 in the same manner as the pulses produced by pulse former 111. The series of pulses produced by pulse former 115 are applied to digital phase comparator 112 through a differentiator 116. Since the initiation of pulses in pulse formers 111 and 115 is dependent upon the instantaneous crossings of predetermined levels by the amplitude of the modulated carrier received by transceiver 100 and the phase shifted output of voltage controlled oscillator 102, respectively, the time difference between respective pulses of the series of pulses applied to phase comparator 112 by differentiators 110 and 116 will be proportional to the signal carried by the modulated carrier received by transceiver 100.

Digital phase comparator 112 produces a series of pulses whose widths are proportional to the signal carried by the modulated carrier received by transceiver 100. This series of pulses is applied through low pass filter 117 and amplifier 118 to auxiliary control circuit 119. Auxiliary control circuit 119 comprises a filter formed by resistor 120 and capacitor 121, amplifier 122 and phase shifter 114. The ungrounded output of amplifier 118 is connected to one end of resistor 120. The other end of resistor 120 is connected to ground through capacitor 121 and to amplifier 122, the ungrounded output of which is connected to phase shifter 114.

The ungrounded output of amplifier 118 is also connected to one side of primary winding 123 of transformer 124 through blocking capacitor 125. The other side of primary winding 123 is connected to voltage controlled oscillator 102. Secondary winding 126 of transformer 124 is connected to utilization device 127 which, for purposes of illustration, is shown to be a telephone transmitter and receiver.

The operation of transceiver 100 may best be understood by reference to FIG. 1. The modulated carrier, after having passed through a transmission medium in which the modulated carrier suffers phase shift, is received by transceiver 100 and transferred to level sensor 106 through hybrid 101. Level sensor 106 causes a pulse to be initiated by pulse former 111 when the level of the modulated carrier received by the transceiver rises above a predetermined level and causes the pulse to be terminated by pulse former 111 when the amplitude of the modulated carrier received by transceiver 100 falls below another predetermined level.

Pulse former 111 produces a series of pulses whose initiation is determined by the crossing of the predetermined level and whose termination is determined by the crossing of the latter predetermined level. The predetermined levels may be zero volts and the initiation and termination of the pulses produced by pulse former 111 will be determined by the zero crossings of the modulated carrier received by transceiver 100. The pulse train produced by pulse former 111 is passed through differentiator 110 before being applied to digital phase comparator 112. The output of voltage controlled oscillator 102 is passed through phase shifter 114 before being applied to level sensor 113, pulse former 115, and differentiator 116, serving to convert the phase shifted output of voltage controlled oscillator 102 to a series of pulses in the same manner as produced by level sensor 106, pulse former 111 and differentiator 110. Phase shifter 114 shifts the phase of the output of voltage controlled oscillator 102 in order to compensate for attenuation suffered in the transmission medium by the modulated carrier received by transceiver 100.

Digital phase comparator 112 produces an output which is proportional to the phase difference between the signals it compares. The time relationship between the pulses applied to digital phase comparator 112 causes digital phase comparator 112 to produce a pulse whose width is proportional to this time relationship. Digital phase comparator 112 is essentially a flip-flop which is triggered ON and OFF by a positive pulse applied by differentiator 110 or 116. Therefore, digital phase comparator 112 produces a series of pulses whose width is representative of the time relationship between the pulses applied to it. This time relationship is determined by the respective zero crossings of the modulated carrier received by transceiver 100 and the phase shifted output of voltage controlled oscillator 102. Initially, the phase shift suffered in the transmission medium by the modulated carrier is not compensated for by auxiliary control circuit 119. Therefore, initially, phase shifter 114 does not phase shift the output of voltage controlled oscillator 102. Digital phase comparator 112 produces an output which is passed through low pass filter 117 and amplifier 118 to the auxiliary control circuit 119. Assuming initially that the modulating frequency of the carrier received by transceiver 100 is equal to the rest frequency of voltage controlled oscillator 102, a series of pulses having a constant width will be produced by digital phase comparator 112. Low pass filter 117 produces an output whose amplitude is proportional to the width of a pulse applied to it. Therefore, for a constant width pulse applied to low pass filter 117, it will produce a constant amplitude level output. As the pulse width from digital phase comparator 112 varies, the amplitude level produced by low pass filter 117 will also vary. Capacitor 126 blocks this D.C. output from passing to voltage controlled oscillator 102. Since this D.C. voltage is representative of the phase shift suffered in the transmission medium, it controls phase shifter 114 and compensates for the phase shift suffered by the received modulated carrier in the transmission medium by phase shifting the output of voltage controlled oscillator 102 before it is applied to level sensor 113.

After an initial "lock-in" period, digital phase comparator 112 produces an output which is representative of the signal carried by the modulated carrier. This signal will, in telephone transmission, be in the voice frequency range. Resistor 120 and capacitor 121 effectively serve to attenuate the voice frequency information and prevent it from reaching phase shifter 114 while capacitor 125 will pass the voice frequency information on to utilization device 127 and voltage controlled oscillator 102. The voice frequency information reaching voltage controlled oscillator 102 will cause it to shift its output phase to more nearly equal the phase of the signal carried by the modulated carrier. Thus, transceiver 100 operates for voice frequencies as a phase locked loop in the tracking mode.

Figure 2:
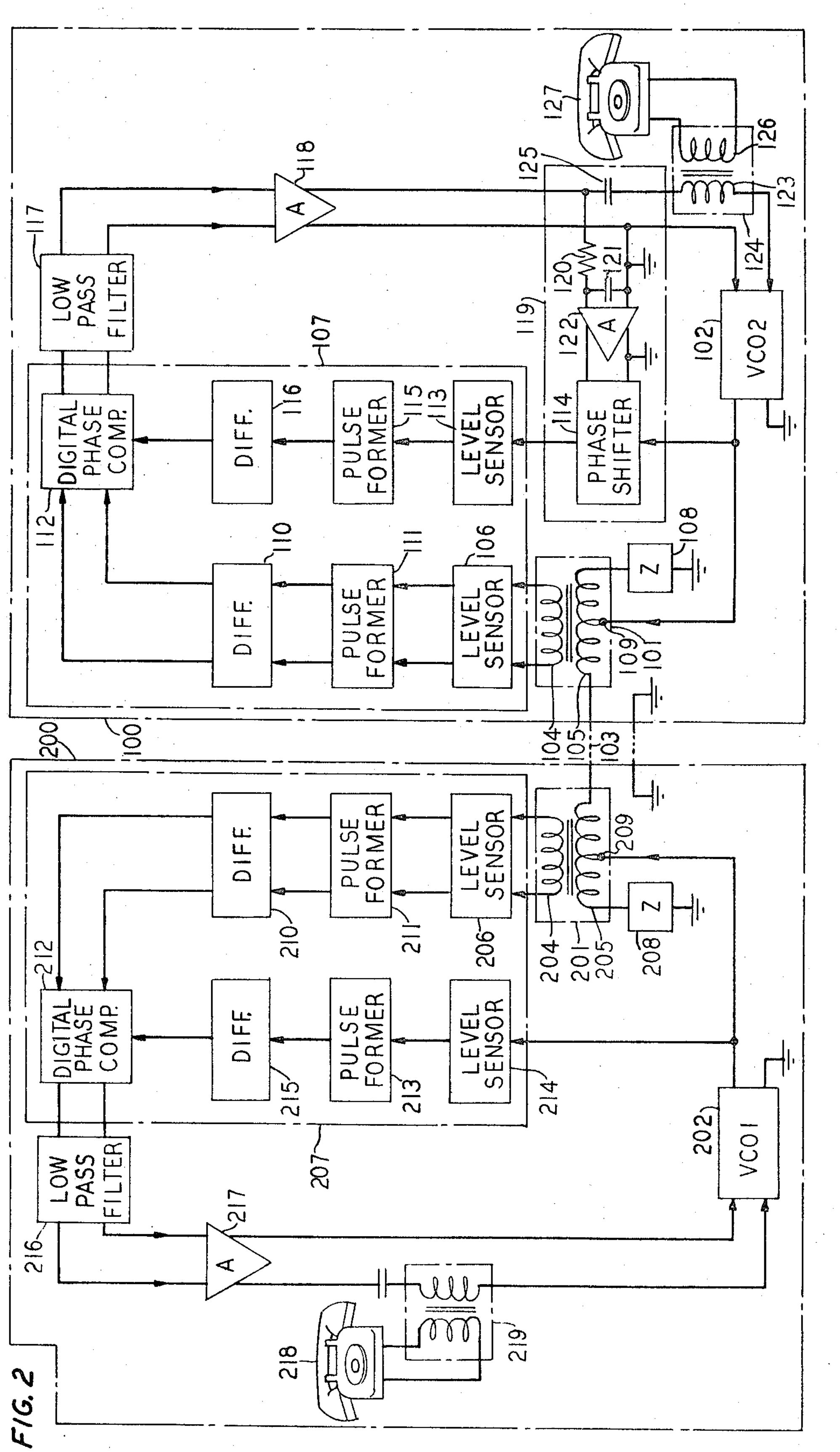
FIG. 2 is a block diagram of a bilateral transmission system comprising a transceiver at each end employing essentially a phase locked loop in which one of the transceivers compensates for phase shift suffered by the modulated carrier through the transmission medium.

FIG. 2 is a block diagram of a digital bilateral transmission system embodying the principles of the present invention so that a bilateral transmission system employing essentially digital phase locked loops at each end as transceivers may be employed when significant phase shift is experienced by the modulated carrier in the transmission medium. The bilateral transmission system comprises digital phase locked loop 200, transmission line 103, and transceiver 100. The operation of transceiver 100 has been set forth and fully explained in FIG. 1. Therefore, the same numerals are employed in FIG. 2 for transceiver 100 in explaining its operation as part of the digital bilateral transmission system.

Transceiver 200 transmits and receives a modulated carrier to and from transceiver 100 respectively. Means are provided in transceiver 200 to separate the transmitted from the received modulated carrier. Hybrid 201, which is part of transceiver 200, serves this separation function, insuring that the modulated carrier output of voltage controlled oscillator 202 is transmitted to transmission line 103. A voltage controlled oscillator whose frequency output is linearly proportional to its voltage input may be used in the present invention. An example of a voltage controlled oscillator suitable for use in the present invention may be found on page 67 of "Phaselock Techniques," written by F. M. Gardner and published by John Wiley & Sons, Inc. in 1966. Hybrid 201 consists of primary winding 204 and secondary winding 205. Primary winding 204 is connected to level sensor 206 which is included as part of the analog to digital converter and digital phase comparator 207. One end of secondary winding 205 is connected to terminating impedance 208 while the other end of secondary winding 205 is connected to transmission line 103. Secondary winding 205 is tapped at point 209 which is connected to voltage controlled oscillator 202. Hybrid 201 insures that the output of voltage controlled oscillator 202 received at point 209 is transferred to transmission line 103 and not transferred to primary winding 204. In addition, hybrid 201 insures that the modulated carrier received by transceiver 200 at secondary winding 205 is transferred to primary winding 204 while not being transferred to voltage controlled oscillator 202. Therefore, the hybrid serves to separate the modulated carrier received from that transmitted by transceiver 200.

The modulated carrier received by transceiver 200 is applied to level sensor 206 through hybrid 201. The output of level sensor 206 is connected to differentiator 210 through pulse former 211. Level sensor 206 causes pulse former 211 to initiate a pulse when the level of the modulated carrier received by transceiver 200 crosses a predetermined level and causes pulse former 211 to terminate the pulse when the modulated carrier received by transceiver 200 falls below another predetermined level. Since the signal carried by the carrier received by transceiver 100 causes the modulation frequency to vary, the beginning of each pulse produced by pulse former 211 will vary in accordance with the signal carried by the modulated carrier received by transceiver 200. The output of pulse former 211 is differentiated by differentiator 210 before being applied to digital phase comparator 212.

Voltage controlled oscillator 202 provides a carrier wave for the signal to be transmitted by transceiver 200. The output of voltage controlled oscillator 202 is connected to tapped point 209 of hybrid 201 for transmission through transmission line 103. In addition, the output of voltage controlled oscillator 202 is connected to pulse former 213 through level sensor 214. Level sensor 214 causes pulse former 213 to initiate a pulse when the output of voltage controlled oscillator 202 rises above a predetermined level and terminate the pulse when the output of voltage controlled oscillator 202 falls below another predetermined level. A series of pulses is produced at the output of pulse former 213 in the same manner as the pulses produced by pulse former 211. The series of pulses produced by pulse former 213 are applied to digital phase comparator 212 through a differentiator 215. Since the initiation of pulses in pulse formers 211 and 213 is dependent upon the instantaneous crossings of the predetermined levels by the amplitude of the modulated carrier received by transceiver 200 and the output of voltage controlled oscillator 202, respectively, the time difference between respective pulses of the series of pulses applied to phase comparator 212 by differentiators 210 and 215 will be proportional to the signal carried by the modulated carrier received by transceiver 200.

Digital phase comparator 212 produces a series of pulses whose widths are proportional to the signal carried by the modulated carrier received by transceiver 200. This series of pulses is applied through low pass filter 216 and amplifier 217 to utilization device 218 through transformer 219. For purposes of illustration, utilization device 218 is shown to be a telephone transmitter and receiver. The output of amplifier 217 is also, in part, supplied to voltage controlled oscillator 202 to adjust the frequency of its output so that it may more nearly equal the frequency of the modulated carrier received by transceiver 200.

Voltage controlled oscillator 202 provides a carrier wave for the signal to be transmitted by transceiver 200. Utilization device 218 modulates the output of voltage controlled oscillator 202 through transformer 219. This modulated frequency output is transferred to transmission line 103 by hybrid 201.

The initiation of each pulse in the series of pulses applied to digital phase comparator 212 is dependent upon the signal carried by the modulated carrier received by transceiver 200 because the modulating signal causes the modulation frequency and, consequently, the crossing of the predetermined level by the modulated carrier, to vary. Digital phase comparator 212 is responsive to the time relationship between respective pulses of the series of pulses it compares and produces a series of pulses whose width varies in response to the time relationship. Level sensor 206 may cause a pulse to be initiated by the pulse former when the level of the modulated carrier rises above zero volts and cause the pulse to be terminated when the level falls below zero volts. By providing that level sensor 106 is sensitive to zero crossings, the pulses produced by the level sensor are independent of the amount of attenuation suffered by the modulated carrier in the transmission medium.

The digital bilateral transmission system in FIG. 2 comprises phase locked loop 200 and transceiver 100 interconnected by transmission line 103. The operations of digital phase locked loop 200 and transceiver 100 have been described above with a view to their being used in a bilateral transmission system as shown in FIG. 2. It is, therefore, unnecessary to repeat the detailed description of the operation of transceiver 100 since its operation was explained in detail with reference to FIG. 1.

The carrier initially transmitted by voltage controlled oscillator 102 may have a frequency which is different from the output of voltage controlled oscillator 202. Digital phase comparator 212 will produce a series of pulses whose width will be proportional to this frequency difference and is used to control the frequency of the output of voltage controlled oscillator 202 in order to maintain synchronism between both voltage controlled oscillators. Synchronism between the frequencies of the signals produced by the voltage controlled oscillators is maintained in phase locked loop 200 by a constant D.C. bias which is applied to voltage controlled oscillator 202.

A modulated carrier is transmitted from phase locked loop 200 to transceiver 100 through transmission line 103. Since the frequency of voltage controlled oscillator 202 has been previously synchronized with the frequency of voltage controlled oscillator 102, phase comparator 112 produces an output which is representative of the signal emanating from utilization device 218 since the carrier frequency of voltage controlled oscillator 202 is modulated by the output of utilization device 218. The information in a frequency modulated carrier is carried in the phase of its carrier. Since digital phase comparator 112 produces an output which is proportional to time relationship between the series of pulses it compares, and since prior to the modulation of the carrier wave by signal source 218 the signals compared by phase comparator 218 had the phase shift compensated for, the output of digital phase comparator 112 will be proportional to the additional phase shift which is representative of the signal emanating from signal source 213 and is in the form of a digital pulse train. This varying output from phase comparator 112 is passed through to utilization device 127 through capacitor 125 and transformer 124, as above described.

The system described in FIG. 2 automatically compensates for wide variations in phase shift suffered in the transmission medium. The compensation is automatic and it may be accomplished without complex adjustments. For example, when the bilateral transmission system shown in FIG. 2 is employed in a telephone system, phase locked loop 200 is installed at the central office and transceiver 100 is installed at the subscriber location. No adjustments would be made at the subscriber location in order to have accurate telephone transmission. In addition, it is clear that a large number of bilateral transmission systems may be employed in a telephone system where, for each subscriber equipped with a transceiver, there is a corresponding phase locked loop in the central office. Since the distance between the central office and each subscriber may vary, the phase shift suffered by the transmitted modulated carrier will also vary. But since the auxiliary control circuit compensates for a wide range of phase variations, the system described in FIG. 2 is well suited for this application.

Figure 3:
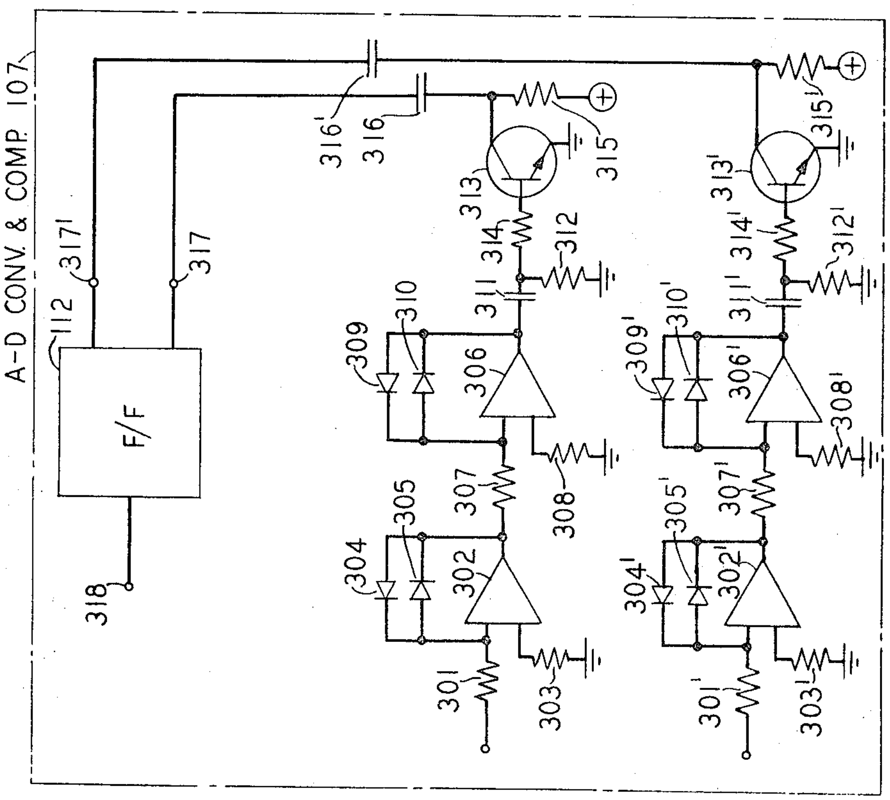
FIG. 3 is a schematic diagram of the analog to digital converter and digital phase comparator that may be used in the systems represented by FIGS. 1 and 2.

FIG. 3 is a schematic diagram of the analog to digital converter and digital phase comparators 107 and 207 utilized in FIGS. 1 and 2, respectively. The upper and lower portions of the bottom portion of FIG. 3 have the same operation and primed numerals are used for the lower portion to distinguish it from the upper. The description of operation of FIG. 3 will relate to the upper portion, while the operation of the bottom portion, designated by primed numbers, will not be set forth since it would be merely repetitious.

The modulated carrier received by transceiver 100 is transferred to one end of resistor 301, the second end of which is connected to the input of differential amplifier 302. A reference voltage of zero volts potential is applied to differential amplifier 302 through resistor 303. The anode of diode 304 is connected to the output of differential amplifier 302, while the cathode of diode 304 is connected to the second end of resistor 301. The anode terminal of diode 305 is connected to the second end of resistor 301, while the cathode terminal is connected to the output of differential amplifier 302. As the modulated carrier rises above zero volts, a pulse will be produced at the output of differential amplifier 302 and, as the amplitude of the modulated carrier received by transceiver 100 falls below zero volts, the pulse will be terminated at the output of differential amplifier 302. Diodes 304 and 305 limit the output level of differential amplifier 302. Therefore, the modulated carrier received by transceiver 100 will be converted to a series of pulses where each pulse will be initiated as the amplitude of the modulated carrier received by transceiver 100 rises above zero volts and terminated when the amplitude falls below zero volts. In order to insure the accuracy of the analog to digital conversion, a second level sensor and conversion stage is utilized. The output of differential amplifier 302 is connected to a first input terminal of differential amplifier 306 through resistor 307. A reference voltage of zero volts is applied to the second input of differential amplifier 306 through resistor 308. The anode terminal of diode 309 is connected to the output of differential amplifier 306, while the cathode side of diode 309 is connected to the first input terminal of different amplifier 306. The anode side of diode 310 is connected to the first input terminal of differential amplifier 306, and the cathode terminal of differential amplifier 306, and the cathode terminal of diode 310 is connected to the output of different amplifier 306. Diodes 309 and 310 limit the amplitude of the output of differential amplifier 306.

The output of differential amplifier 306 is applied to a differentiator comprising capacitor 311 and resistor 312. The output of differential amplifier 306 is applied to one end of capacitor 311, while the other end of capacitor 311 is applied to ground through resistor 312. Differentiation of the pulses produced by differential amplifier 306 increases the accuracy of the conversion since the differentiation further emphasizes the initiation point of each pulse.

The differentiated pulses are then amplified before being applied to digital phase comparator 112. Numeral 112 is used in FIG. 3 since it represents the digital phase comparators set forth in FIGS. 1 and 2 and numerically designated 112 and 212, respectively. The second side of capacitor 311 is connected to the base of NPN transistor 313 through resistor 314. A positive source of reference potential is connected to the collector terminal of NPN transistor 313 through load resistor 315. The collector of NPN transistor 313 is capacitively coupled through capacitor 316 to input terminal 317 of digital phase comparator 112.

The output of voltage controlled oscillator 102 is also converted to a series of pulses and applied to digital phase comparator 12 by the lower circuit designated by primed numerals. The output of voltage controlled oscillator 102 is applied to one end of resistor 301'. The operation of the lower portion of the bottom portion of FIG. 3 is the same as the operation of the upper portion described above.

Digital phase comparator 112 comprises a standard bistable multivibrator (flip-flop). When the converted, differentiated, and amplified pulse derived from the modulated carrier received by transceiver 100 is applied to flip-flop 112 through capacitor 316 at terminal 317, its output at terminal 318 is caused to go positive. When the subsequent converted, differentiated, and amplified output of voltage controlled oscillator 102 is applied to input terminal 317' of flip-flop 112, the output produced at terminal 318 is caused to return to its ground state. Flip-flop 112 will change state each time a positive pulse is applied to either terminal 317 or 317'. Therefore, a pulse will be produced whose width is determined by the time relationship between respective pulses of the pulse trains applied to flip-flop 112 which cause it to change state. Use of a bistable multivibrator which varies between positive potential and ground is arbitrary and any suitable bistable multivibrator may be used with the present invention.

Since the signal carried by the modulated carrier received by transceiver 100 causes the frequency of the modulated carrier to vary, it will cause the zero crossing of the modulated carrier to vary with respect to time.

Therefore, the initiation of the pulse output of flip-flop 112 will be determined by this frequency variation. The output pulse width produced at terminal 318 of flip-flop 112 will be proportional to the time difference between the zero crossings of the received modulated carrier and the output of voltage controlled oscillator 102.

Figure 4:
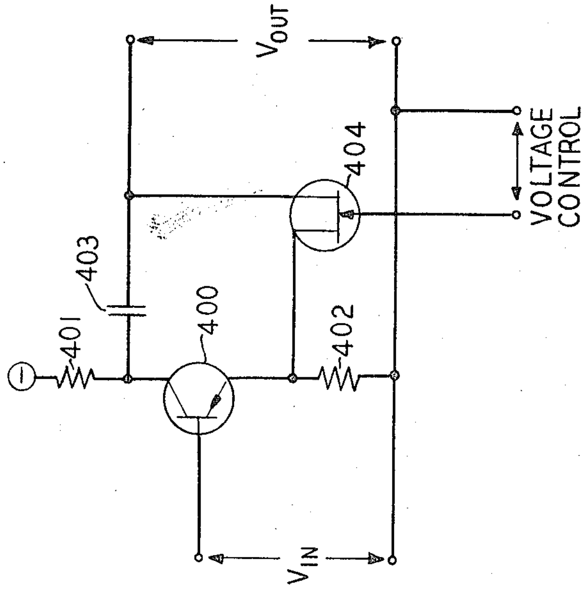
FIG. 4 is a schematic diagram of a phase shifter that may be used in the systems represented by FIGS. 1 and 2.

FIG. 4 is a schematic diagram of a phase shifter that may be used in the embodiments of the present invention shown in FIGS. 1 and 2. The output of voltage controlled oscillator 102 is represented as $V_{in}$ and the shifted input signal which is applied to level sensor 113 is represented as $V_{out}$. The collector of PNP transistor 400 is connected to a biasing source of negative potential through resistor 401, while the emitter of PNP transistor 400 is connected to a point of reference potential through emitter resistor 402. A phase shifting network is connected to PNP transistor 400. One end of capacitor 403 is connected to the collector of transistor 400, while the other end of capacitor 403 is connected to the drain terminal of field effect transistor 404. The source terminal of field effect transistor 404 is connected to the emitter of transistor 400. The gate terminal of field effect transistor 404 is connected to a voltage control. This voltage control may be the output of amplifier 122 in the auxiliary control circuit 119 in FIGS. 1 and 2. The field effect transistor is a device whose impedance from source to drain terminals varies under control of the voltage control. Thus the phase shifting network comprised by capacitor 403 and field effect transistor 404 will vary its circuit response under control of the voltage control. Thus when the output of amplifier 122 in the auxiliary control circuit shown in FIGS. 1 and 2 increases, the phase shift added by the phase shifter shown in FIG. 4 will also increase since the output from amplifier 122 controls field effect transistor 404.

The digital transceiver and phase locked loop have been described as including level sensors and pulse formers. It is to be understood that other arrangements may be devised to perform the analog to digital conversion. Any arrangement which provides means to convert a periodic analog signal to a series of pulses having the same period as the analog signal may be used in the present invention.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A digitalized phase locked loop for transmitting and receiving a modulated carrier comprising:
   - oscillating means for producing a first analog signal, the frequency of the first analog signal being proportional to the voltage at the input of said oscillating means,
   - means for applying the first analog signal to a transmission medium and to means for shifting the phase of the first analog signal,
   - means responsive to the phase shifted version of the first analog signal for producing a first pulse signal, the pulses of the first pulse signal occurring whenever the phase shifted first analog signal rises above a first reference level or falls below a second reference level,
   - means for receiving a second analog signal comprising a modulated carrier from the transmission medium,
   - means responsive to the second analog signal for producing a second pulse signal, the pulses of the second pulse signal occurring whenever the second analog signal rises above a third reference level or falls below a fourth reference level,
   - means responsive to the first and second pulse signals for linearly producing an information signal proportional to the time displacement between respective pulses of the first and second pulse signals, means for filtering from the information signal all of the component frequencies greater than a cutoff frequency, means for amplifying the unfiltered components of the information signal, means for separating the amplified components of the information signal into a remainder signal and a signal for controlling said phase shifting means, means for applying the remainder signal to a utilization device and to the input of said oscillating means, and means for applying signals from said utilization device to the input of said oscillating means.

2. A phase locked loop transceiver as claimed in claim 1 wherein said means for separating the amplified information signals comprises means for extracting the direct current component from the amplified unfiltered components of the information signal, the remainder of the amplified unfiltered components comprising the remainder signal, and means for amplifying the direct current component, the amplified direct current component comprising the signal for controlling said phase shifting means.

3. Apparatus as set forth in claim 2 wherein said phase shifting means includes at least one voltage sensitive variable impedance element whose impedance is controlled by the output level of said wave shaping means.

4. A bilateral transmission system comprising a first phase locked loop transceiver, a second phase locked loop transceiver, and a lossy transmission medium, said first phase locked loop transceiver transmitting a first analog signal comprising a first modulated carrier to said second phase locked loop transceiver over said transmission medium and said second phase locked loop transceiver transmitting a second analog signal comprising a second modulated carrier over said transmission medium to said first phase locked loop transceiver, said first phase locked loop transceiver comprising first oscillating means for producing the first analog signal, the frequency of the first analog signal being proportional to the voltage at the input of said first oscillating means, means for applying the first analog signal to the transmission medium and to a means for shifting the phase of the first analog signal, means responsive to the phase shifted version of the first analog signal for producing a first pulse signal, the pulses of the first pulse signal occurring whenever the phase shifted first analog signal rises above a first reference level or falls below a second reference level, means for receiving the second analog signal from the transmission medium, means responsive to the second analog signal for producing a second pulse signal, the pulses of the second pulse signal occurring whenever the second analog signal rises above a third reference level or falls below a fourth reference level, means responsive to the first and second pulse signals for producing a first information signal proportional to the time displacement between respective pulses of the first and second pulse signals, means for filtering from the first information signal all of the component frequencies greater than a first cutoff frequency, means for amplifying the unfiltered components of the first information signal, means for separating the amplified components of the first information signal into a remainder signal and a signal for controlling said means for phase shifting the first analog signal, means for applying the first remainder signal to a first utilization device and to the input of said first oscillating means, and means for applying signals from said first utilization device to the input of said first oscillating means, and said second phase locked loop transceiver comprising second oscillating means for producing the second analog signal, the frequency of the second analog signal being proportional to the voltage at the input of said second oscillating means, means for applying the second analog signal to said transmission medium, means for receiving the first analog signal from said transmission medium, means responsive to the second analog signal for producing a third pulse signal, the pulses of the third pulse signal occurring whenever the second analog signal rises above a fifth reference level or falls below a sixth reference level, means responsive to the first analog signal for producing a fourth pulse signal, the pulses of the fourth pulse signal occurring whenever the analog signal rises above a seventh reference level or falls below an eighth reference level, means responsive to the third and fourth pulse signals for linearly producing a second information signal proportional to the time displacement between respective pulses of the third and fourth pulse signals, means for filtering from the second information signal all components greater than a second cutoff frequency, means for applying the unfiltered components of the second information signal to a second utilization device and to the input of said second oscillating means, and means for applying signals from said second utilization device to the input of said second oscillating means.

5. A bilateral transmission system as claimed in claim 4 wherein said means for separating the amplified components of the first information signals comprise means for extracting the direct current component from the amplified unfiltered components of the first information signal, the remainder of the amplified unfiltered components comprising the remainder signal, and means for amplifying the direct current component, the amplified direct current component comprising the signal for controlling said phase shifting means.

6. Apparatus as set forth in claim 5 wherein said phase shifting means includes a voltage sensitive variable impedance device whose impedance is controlled by the amplitude of the output of said wave shaping means comparator.

7. A digitalized phase locked loop transceiver as claimed in claim 1 wherein said means for producing a first pulse signal comprises:

a first level sensing means, a first pulse forming means, and a first differentiating circuit, said first level sensing means indicating to said first pulse forming means whenever the phase shifted first analog signal rises above the first reference level or falls below the second reference level, said first pulse forming means initiating a pulse whenever the phase shifted first analog signal rises above the first reference level or falls below the second reference level, and said first differentiating circuit taking a first time derivative of pulses from said first pulse forming means, the first time derivative comprising the first pulse signal, and said means for producing a second pulse signal comprises a second level sensing means, a second pulse forming means and a second differentiating circuit, said second level sensing means indicating to said second pulse forming means whenever the second analog signal rises above a third reference level or falls below a fourth reference level, said second pulse forming means initiating a pulse whenever the second analog signal rises above the third reference level and terminating the pulse whenever the second analog signal falls below the fourth reference level, and said second differentiating circuit taking a second time derivative of pulses from said second pulse forming means, the second time derivative comprising the second pulse signal.

8. Apparatus as set forth in claim 1 wherein said utilization device is a telephone transmitter and receiver.

References Cited

UNITED STATES PATENTS

| | | | |
|---|---|---|---|
| 2,846,572 | 9/1958 | Elliott | 325—17 |
| 3,102,164 | 8/1963 | Roiz | 178—69.5 |
| 3,384,821 | 5/1968 | Beck | 325—13 |

RICHARD MURRAY, Primary Examiner

B. V. SAFOUREK, Assistant Examiner

U.S. Cl. X.R.

178—69.5; 179—2.5; 325—17, 63; 328—55, 155; 343—180